United States Patent
Powers, III et al.

(10) Patent No.: US 8,384,665 B1
(45) Date of Patent: Feb. 26, 2013

(54) METHOD AND SYSTEM FOR MAKING A SELECTION IN 3D VIRTUAL ENVIRONMENT

(75) Inventors: William Robert Powers, III, San Francisco, CA (US); Charles Musick, Jr., Belmont, CA (US); Dana Wilkinson, Mountain View, CA (US)

(73) Assignee: AiLive, Inc., Mountain View, CA (US)

( * ) Notice: Subject to any disclaimer, the term of this patent is extended or adjusted under 35 U.S.C. 154(b) by 211 days.

(21) Appl. No.: 12/835,755

(22) Filed: Jul. 14, 2010

Related U.S. Application Data

(63) Continuation-in-part of application No. 12/020,431, filed on Jan. 25, 2008, and a continuation-in-part of application No. 11/486,997, filed on Jul. 14, 2006, now Pat. No. 7,702,608.

(60) Provisional application No. 60/990,898, filed on Nov. 28, 2007.

(51) Int. Cl.
  *G09G 5/00* (2006.01)
  *G06F 3/033* (2006.01)
  *G01P 15/00* (2006.01)
  *G01P 3/00* (2006.01)
  *G01C 9/00* (2006.01)
  *A63F 13/04* (2006.01)
  *A63F 13/06* (2006.01)

(52) U.S. Cl. ........ 345/156; 345/157; 345/158; 345/161; 345/162; 345/163; 345/169; 702/141; 702/145; 702/150; 702/151; 702/152; 702/153; 702/154; 463/36; 463/37; 463/47

(58) Field of Classification Search ............. 463/36, 463/37, 47; 345/156–158, 162–163, 169; 702/141, 145, 150–154
See application file for complete search history.

(56) References Cited

U.S. PATENT DOCUMENTS

| | | | | |
|---|---|---|---|---|
| 7,489,298 | B2 * | 2/2009 | Liberty et al. | 345/158 |
| 7,489,299 | B2 * | 2/2009 | Liberty et al. | 345/163 |
| 7,746,321 | B2 * | 6/2010 | Banning | 345/157 |
| 7,796,116 | B2 * | 9/2010 | Salsman et al. | 345/158 |
| 7,850,526 | B2 * | 12/2010 | Zalewski et al. | 463/36 |
| 7,854,655 | B2 * | 12/2010 | Mao et al. | 463/30 |
| 7,864,159 | B2 * | 1/2011 | Sweetser et al. | 345/158 |
| 7,961,909 | B2 * | 6/2011 | Mandella et al. | 382/103 |
| 8,291,346 | B2 * | 10/2012 | Kerr et al. | 715/856 |
| 2006/0287085 | A1 * | 12/2006 | Mao et al. | 463/37 |
| 2006/0287086 | A1 * | 12/2006 | Zalewski et al. | 463/37 |
| 2007/0013657 | A1 * | 1/2007 | Banning | 345/157 |
| 2007/0270215 | A1 * | 11/2007 | Miyamoto et al. | 463/32 |
| 2009/0153479 | A1 * | 6/2009 | Gu et al. | 345/158 |
| 2010/0194687 | A1 * | 8/2010 | Corson et al. | 345/158 |
| 2010/0273130 | A1 * | 10/2010 | Chai et al. | 434/20 |
| 2011/0043521 | A1 * | 2/2011 | Smyth | 345/424 |
| 2011/0118031 | A1 * | 5/2011 | Mao et al. | 463/37 |
| 2011/0124410 | A1 * | 5/2011 | Mao et al. | 463/31 |
| 2011/0227825 | A1 * | 9/2011 | Liberty et al. | 345/158 |

* cited by examiner

*Primary Examiner* — Arthur O. Hall
*Assistant Examiner* — Bach Hoang
(74) *Attorney, Agent, or Firm* — Joe Zheng

(57) ABSTRACT

Techniques for selecting a portion of a 3D virtual environment are disclosed, where the portion of the 3D virtual environment may be one or more objects in the 3D virtual environment or one of scenes in the 3D virtual environment. A motion sensitive device (controller) is used. The controller generates sensor data sufficient to derive position and orientation of the controller in six degrees of freedom. In one embodiment, when selecting the portion of the 3D virtual environment, the controller generates a ray to an interaction of a display screen provided to display the 3D virtual environment, wherein the ray is further projected into the 3D virtual environment by a ray tracing technique as if the user had a real laser pointer that crosses from the physical world into the 3D virtual environment being displayed. Further a user is optionally to use a secondary input device to select one or more points or objects in a 3D space to control a distance along the ray being used.

23 Claims, 8 Drawing Sheets

METHOD AND SYSTEM FOR MAKING A SELECTION IN 3D VIRTUAL ENVIRONMENT

CROSS REFERENCE TO RELATED APPLICATIONS

This is a continuation-in-part of co-pending U.S. application Ser. No. 12/020,431 filed Jan. 25, 2008, entitled "Self-Contained Inertial Navigation System for Interactive Control Using Movable Controllers", which claims the priority of a provisional application Ser. No. 60/990,898, filed Nov. 28, 2007, and is a continuation-in-part of U.S. application Ser. No. 11/486,997, filed Jul. 14, 2006, now U.S. Pat. No. 7,702,608.

BACKGROUND OF THE INVENTION

1. Technical Field

The invention generally relates to the area of human-computer interaction, and more particularly relates to techniques for selecting objects being displayed or controlling motion and configuration of a virtual object being displayed. With one embodiment of the present invention, inputs from a handheld controller containing inertial sensors allow a user to control an object within a two or three dimensional representation shown to the user, and allow the user to directly manipulate one or more chosen objects by mapping their location and orientation in a virtual space to those of the user in a physical world. Various embodiments of the present invention may be used in computer applications, video games, or on-screen controls for electronic devices.

2. Related Art

There are a number of man-machine interface devices, such as computer mice, joysticks, remote controllers and trackballs, for controlling computer applications and video games. Each of these devices are well understood in the art and primarily focus on converting motions of a human being into an analog motion that is represented on a two dimensional screen. For example, a joystick translates the position of the control stick relative to a center into a velocity that is applied to a point located on a two dimension screen. According to an established convention, a left-right motion of the control stick corresponds to left-right motion on the screen and a forward-away motion of the control stick corresponds to up-down motion on the screen.

This basic approach of remapping inputs to control motions has been extended to cover three-dimensional computer applications using objects such as 3D mice and 3D joysticks. One approach of doing this is described in U.S. Pat. No. 5,898,421. Most of these approaches available today, however, have the disadvantage that the users must learn an artificial convention for how their motions in the physical world correspond to the motions of a pointer in a computer representation. In general, users prefer natural interactions with a computer application.

A natural interaction for a user would be to have a direct control over the motion of an object in a displayed scene. For example, in a sword-fighting game, a natural control for the user would be to have the sword displayed in the game with the same orientation and position as the motion controller in his/her hand. Currently this is possible by having an external system that measures the exact position and/or orientation of the controller in the physical world. A system for doing this is described in U.S. Pat. No. 4,862,152 but requires the addition of bulky sonic sensors and emitters in the vicinity of the user. Essentially, the system is limited by restricting the motions of the user within a predefined range.

Another natural interaction users desire is the ability to directly point at objects by using their hand to point at the image shown on the display. A two-dimensional solution to this particular style of interaction is introduced by Nintendo in the Wii system (US Patent Publication No.: US20070060384), however it requires additional modification of the environment of the user by adding a sensor bar to define a limited range and field of view, restricting the movements of the user to a small range in front of the sensor bar. It would be desirable to have an approach that requires less modification to the user's environment and allows natural three-dimensional pointing interactions.

There is thus a need for techniques that facilitate full control on motions of displayed objects in positions and orientations in six degrees of freedom. Such techniques shall also work in situations in which there are no additional sensors or emitters, or a motion controller is not able to be detected by some or all of the sensors. There is another need for techniques that provide the ability for users to directly select or point at a portion of a displayed virtual environment in 3D, where the portion of the displayed virtual environment may be an object or a part of a scene in the virtual environment.

SUMMARY OF INVENTION

This section summarizes some aspects of the present invention and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Generally speaking, the present invention describes techniques for interpreting user motions of a motion controller in order to allow natural and intuitive interfaces for controlling a computer application or video game. According to one aspect of the present invention, a motion-sensitive device, also referred to as a motion controller herein, held by a user contains inertial sensors providing sensor signals sufficient to derive position and orientation of the controller in six degrees of freedom. Depending on implementation, the user may or may not be in the field of view of a camera. The position and orientation of the motion controller in six degrees of freedom is tracked by analyzing sensor data from the inertial sensors in conjunction with video images, if available, from the camera. This position and orientation are then used for fine control of one or more objects rendered on a display shown to the user. Large motions of the controlled object(s) can then be indicated by the use of specific gestures and button combinations via the motion controller.

According to another aspect of the present invention, the position and orientation of the motion controller are used to control a virtual ray that is used to select one or more objects in a three-dimensional (3D) scene shown on a display, as if the user had a real laser pointer that crosses from the physical world into the 3D virtual scene being displayed. One embodiment of this aspect allows the user to optionally use a defined ray to select one or more points or objects in a 3D space by using a secondary input device to control a distance along the ray being used.

According to still another aspect of the present invention, the relative changes in position of the controller in the physical world is used to control the motion of a selected (target) object in a virtual world by imparting inertia into the selected object in a relationship to the changes in speed and duration of the controller. As a result, the movements of the target object are rendered naturally in a displayed scene in accordance with the changes in motion or position of the controller.

The present invention may be implemented in different forms, including an apparatus, a method or a part of a system. According to one embodiment, the present invention is a system for a user to interact with a virtual environment, the system comprises: a controller including a plurality of inertia sensors providing sensor signals sufficient to derive position and orientation of the controller in six degrees of freedom; a processing unit, receiving the sensor signals, configured to derive the position and orientation of the controller from the sensor signals, map movements of the controller to movements of at least one object in the virtual environment, and allow a mode of operation in which a velocity of the controller is mapped to a rate of change from a scene of the virtual environment to another scene of the virtual environment. As a result, the scene of the virtual environment being displayed is caused to drift over a period of time to a different scene of the virtual environment, after the user activates a mechanism on the controller to cause the scene of the virtual environment to have a sudden movement.

According to another embodiment, the present invention is a method for a user to interact with a virtual environment, the method comprises: receiving sensor signals from a controller sufficient to derive position and orientation of the controller in six degrees of freedom, wherein the controller includes a plurality of inertia sensors that generate the sensor signals when being manipulated by the user; deriving the position and orientation of the controller from the sensor signal; and mapping movements of the controller to movements of at least one object in the virtual environment; and allowing a mode of operation in which a velocity of the controller is mapped to a rate of change from a scene of the virtual environment to another scene of the virtual environment.

According to still another embodiment, the present invention is a system for a user to select a portion of a 3D virtual environment being displayed, the system comprises: a controller including a plurality of inertia sensors providing sensor signals sufficient to derive changes in position and orientation of the controller in six degrees of freedom; a processing unit, receiving the sensor signals, configured to derive the position and orientation of the controller from the sensor signals, and generate a ray originating from a position selected by an application to an interaction of a display screen provided to display the virtual environment, wherein the ray is further projected into the virtual environment by a ray tracing technique. Depending on implementation, the position selected to originate the ray may be a controller used by a user to interact with the 3D virtual environment or a secondary device (e.g., a joystick or another controller).

According to yet another embodiment, the present invention is a method for a user to select a portion of a 3D virtual environment being displayed, the method comprises: receiving sensor signals from a controller sufficient to derive position and orientation of the controller in six degrees of freedom, wherein the controller includes a plurality of inertia sensors that generate the sensor signals when being manipulated by the user; deriving the position and orientation of the controller from the sensor signal; and generating a ray originating from the controller to an interaction of a display screen provided to display the 3D virtual environment, wherein the ray is further projected into the 3D virtual environment by a ray tracing technique.

Other objects, features, benefits and advantages, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
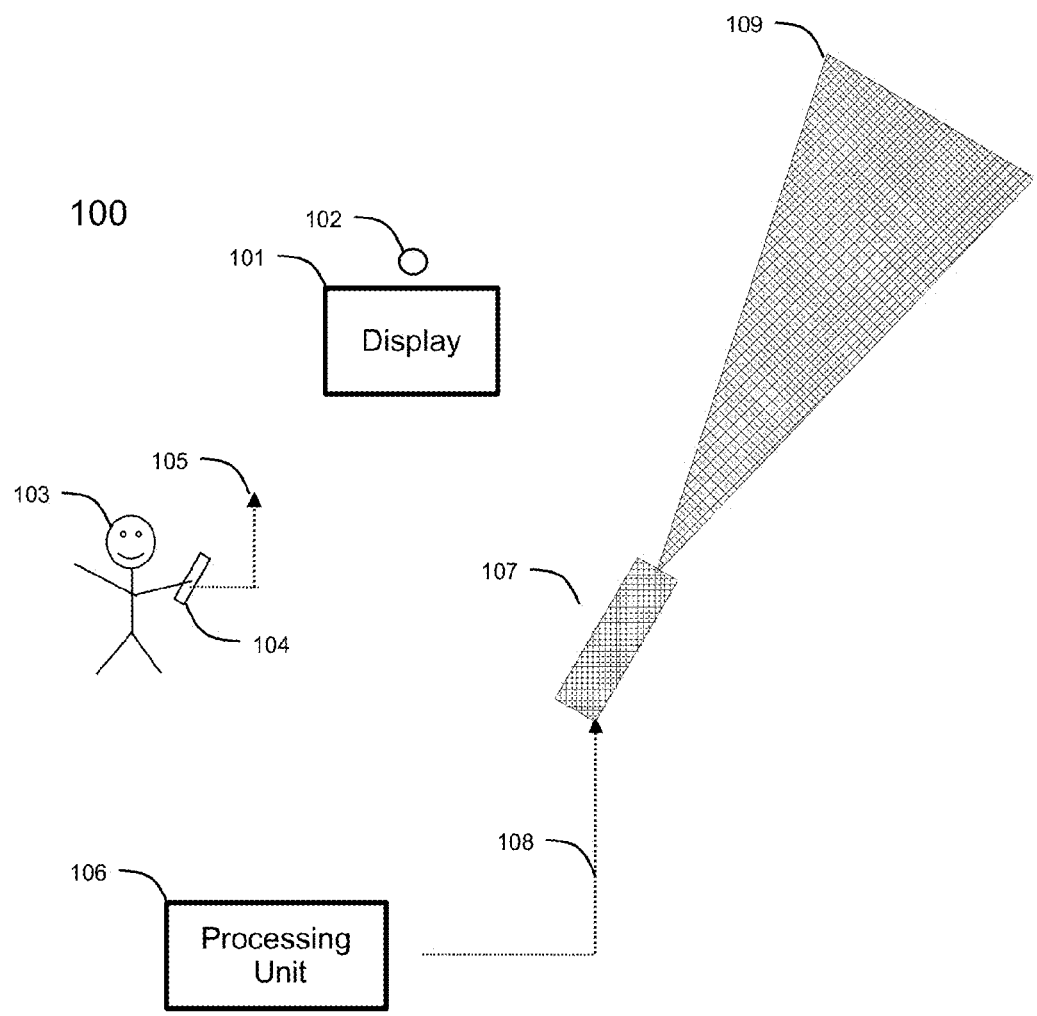
FIG. 1 shows various components in a configuration, according to an embodiment of the invention, in which a camera, a display, a motion controller, and a processing unit are illustrated.

Referring now to the drawings, in which like numerals refer to like parts throughout the several views. FIG. 1 shows an exemplary configuration 100 according to an embodiment of the invention 100. The configuration 100 includes a display screen or a display 101, a camera 102, a controller 104, and a processing unit 106. The display 101 is a two-dimensional flat display (e.g., a TV screen or a projector screen). However, the present invention also works when the display 101 is capable of displaying a virtual environment in three dimensions. Although only one camera 102 is shown in FIG. 1, it represents an image capturing system that includes one or more cameras. In some embodiments, it may be more advantageous to include two or more cameras disposed in front of or in the vicinity of a player or a user 103. Depending on implementation, the camera 102 may produce black and white images, color images or infrared images. The controller 104 is a motion sensitive device including a plurality of inertial sensors generating sensor data sufficient to derive positions and orientations of the controller 104 in six degrees of freedom. A form of the controller 104 may come differently, for example, as a standalone handheld game controller, a cellphone, or a part of another device that may be wearable by or attachable to a user. Depending on implementation, the processing unit 106 may be standalone as a console or part of a computing device. In general, the processing unit 106 includes a wireless communication interface (e.g., Bluetooth) to communicate with the controller 104 and is configured to drive the display 101.

According to one embodiment, the controller 104 and the processing unit 106 are integrated as a single device, in which case the processing unit 106 is configured to send instructions to cause the display 101 to render a virtual environment for the user 103 to interact with. In the following description, it is assumed that the controller 104 is being handheld by the user 103 while the processing unit 106 communicates with the controller 104 wirelessly. As shown in the figure, the user 103 is using the controller 104 to perform some movements, referred to as source motion 105, in reacting to a virtual environment being displayed on the display 101. Depending on application, the virtual environment being displayed may be in 2D or 3D. The display 101 may also be a 3D display device or a 3D projector. The source motion 105 in this embodiment is the natural motion performed by the user 103 through his or her movements in 6 degrees of freedom including three translational movements and three rotational movements.

The motion 105 is sensed by inertial sensors embedded in the controller 104 and also captured by the camera 102 in one embodiment. The sensor signals from the controller 104 and the camera 102 are coupled to or transmitted to the processing unit 106. According to one embodiment, the processing unit 106 is loaded with a module that is executed therein to derive the position and orientation of the controller 104 from the sensor signals, with or without the image signals from the camera 102. The derived position and orientation (motion) of the controller 104 are in return used to control the motion of a selected object 107 in a virtual environment. One of the important features, objectives and advantages of this invention is that a target object is controlled with full six degrees of freedom, thus enabling functions of the target object that depend on its orientation.

As an example, there is a case in which a target object represents a flashlight, the motion of the body of the flashlight can be controlled in accordance with the derived motion 108 from the controller 104 by the user, while the orientation of the target object determines what areas 109 within the virtual environment are illuminated. As a second example, a target object represents a pointing device, such as a virtual laser pointer or virtual rifle with a laser sight, and that device could be controlled by the user in order to select other objects within the virtual environment.

It shall be noted that while there is a one-to-one mapping between the original motion of the controller 104 and the motion of a target object, linear and non-linear transformations may be applied when appropriate for a particular application the user is engaged in. As detailed further below, such a mapping relationship may be transformed linearly or non-linearly to optimize the movements by the user in a physical world and corresponding movements of the target object in a virtual world being displayed.

Figure 2A:
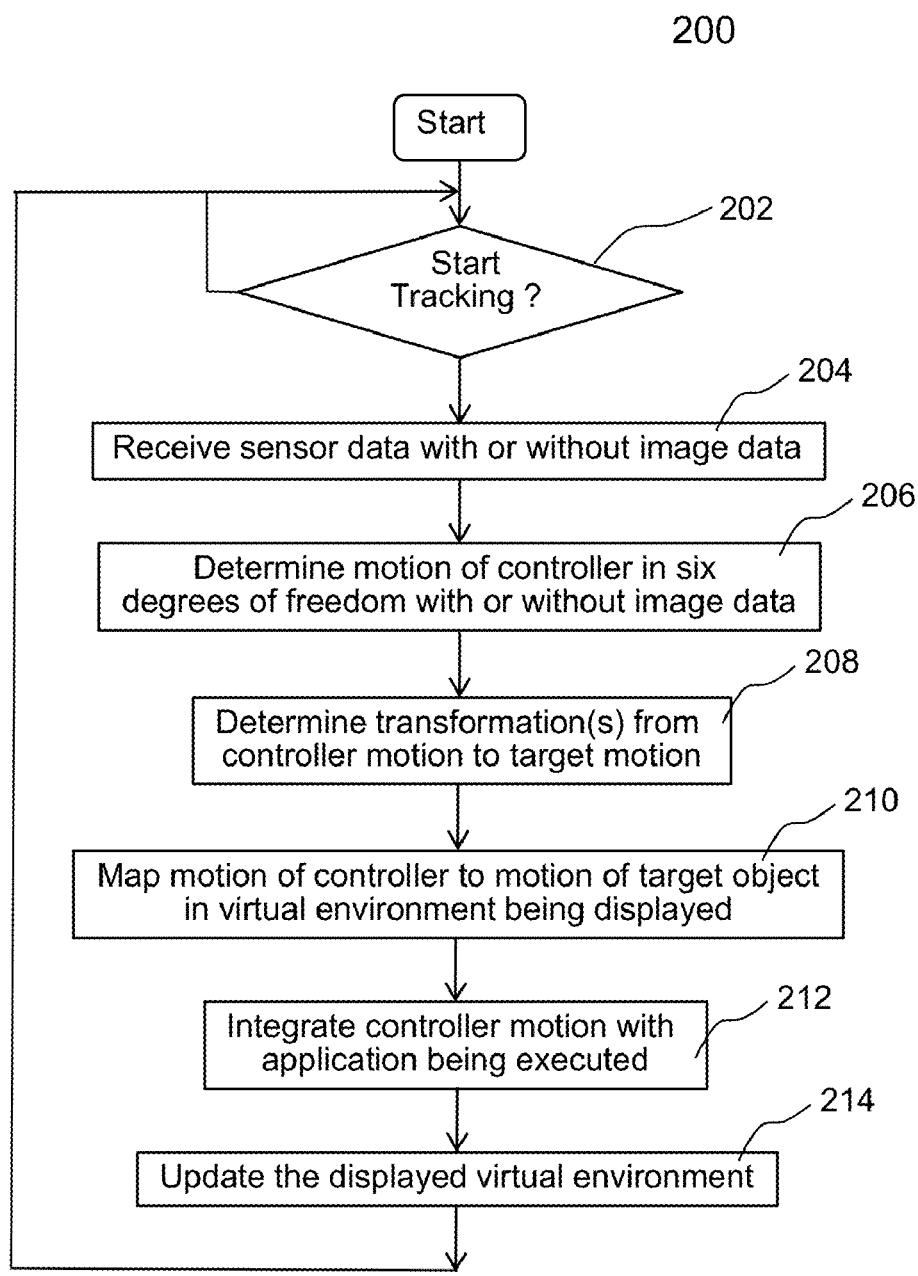
FIG. 2 shows a flowchart or process for controlling a target object.

FIG. 2A shows a flowchart or process 200 for using inertial data from a user to control a target object. The user will have some way of specifying when he or she wishes the movements of a controller being used to affect the target object. In general, there is a control mechanism disposed somewhere near the user to allow the user to start the track of the controller. At 202, the controller or a processing unit is activated to start tracking the motion of the controller. According to one embodiment, there is a button or key on the controller that is activated by the user. Once the controller is activated, the trigger status is active and the movements of the controller are recorded and will be mapped to the target object.

In operation, the user manipulates the controller by waving it, other actions, or entering commands in responding to a scene on a display. The signals from the inertia sensors as well as from the camera are transported to the processing unit at 204. The processing unit is configured to determine the motion from the signals. According to one embodiment, a module is configured and executed in the processing unit as a controller tracker or simply tracker. Upon the activation of the tracker at 202, the tracker starts to track the motion of the controller in six degrees of freedom at 206.

According to one embodiment, the controller includes a plurality of self-contained inertial sensors that are capable of tracking along six axes: three for linear acceleration along the three linear axes, and three axes for determining angular motion. For example, a combination of one tri-axial accelerometer and one tri-axial gyroscope in a controller will function effectively. However, those skilled in the art will be aware that various other combinations of sensors will also function effectively.

Figure 2B:
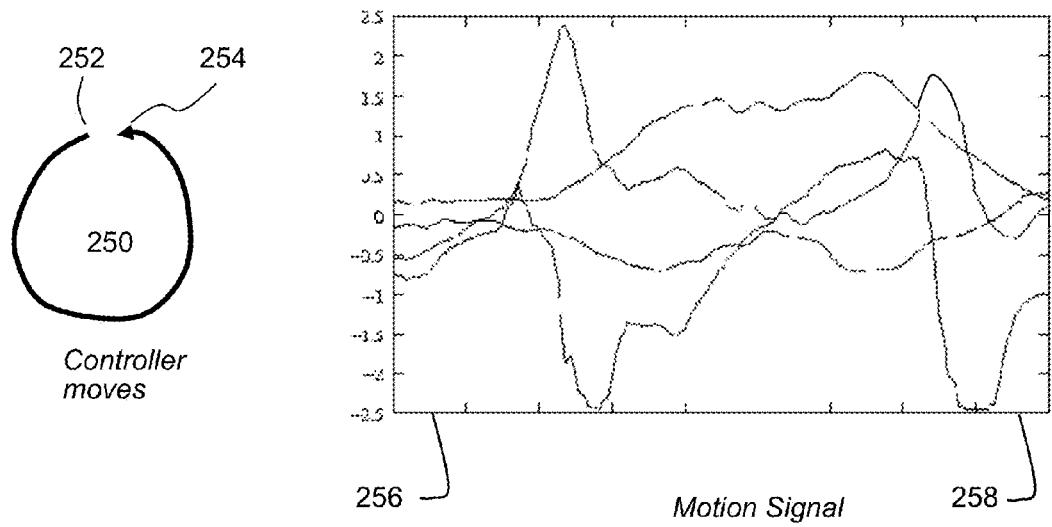

At 206, upon receiving the (sensor and video) signals, the processing unit is configured to integrate and combine gyroscope and accelerometer readings to provide estimates of changes in the controller over a period of time. FIG. 2B shows an exemplary motion signal 250 resulting from a motion of a user swinging a lasso (represented by "0", from 252 to 254). The motion signal 250 shows about 400 samples, or frames of data between points 256 and 258 to swing the lasso, where the motion signal point 256 records the start of the motion 252, and the point 258 records the end of the motion 254. In this example, each frame is composed of 4 floating point numbers that represent an acceleration of the sensor(s) (and hence the controller) along a given axis at that given point in time. As a result, the motion signal 252 is time-series data representing the motion over a period of time. A term "motion signal stream" is sometimes used interchangeably to convey the fact that the sensor signal or data from a motion sensitive device can actually be a continuous stream.

Referring back to 206 of FIG. 2A, with the motion signal stream coming from the controller, the processing unit is executing a module, also referred to herein as a motion tracker, that is implemented to run a set of equations. The following equations show simplified example computations:

$$\text{orientation}(t+dt) = \text{orientation}(t) + \text{Gyro}(t) * dt \quad (1)$$

$$\text{velocity}(t+dt) = \text{velocity}(t) + (\text{orientation}(t) * (\text{Acc}(t) - \text{(Centripetal Accelerations from rotation at time } t)) - \text{Gravity}) * dt; \quad (2)$$

$$\text{position}(t+dt) = \text{position}(t) + \text{velocity}(t+dt) * dt \quad (3)$$

In equation (1) above, Gyro(t) includes three orthogonal readings of angular velocity at time t. Multiplying by dt, the time elapsed since the previous readings, gives the angular change around each axis since the previous readings. This change can be applied to the previous estimate of orientation. Embodiments for making these computations depend on the form in which the orientation information is stored. In the games industry, quaternions are commonly used for this purpose, in which case the angular change from the Gyro(t)*dt term can be converted to a quaternion rotation and added using quaternion arithmetic.

In equation (2) above, Acc(t) includes three orthogonal readings of acceleration at time t in the frame of reference of the object. If the accelerometers are not physically co-located with the gyroscopes, the computation first subtracts any accelerations resulting from the accelerometers rotating around the location of the gyroscopes. For example, if the accelerometers are displaced along the z-axis of the object, the following adjustments would need to be made to the accelerometer readings: Since Acc(t) and Gyro(t) are vectors, [0], [1], and [2] are used to refer to their individual scalar components.

$$\text{Increase Acc}(t+dt)[0] \text{ by } AA[1]*z\text{Offset}-(Gyro(t+dt)[0]*Gyro(t+dt)[2])*z\text{Offset} \quad (4)$$

$$\text{Increase Acc}(t+dt)[1] \text{ by } -AA[0]*z\text{Offset}-(Gyro(t+dt)[1]*Gyro(t+dt)[2])*z\text{Offset} \quad (5)$$

$$\text{Increase Acc}(t+dt)[2] \text{ by } (Gyro(t+dt)[0]\text{``}2+Gyro(t+dt)[1]\text{''}2)*z\text{Offset} \quad (6)$$

where $$AA[0]=(Gyro(t+dt)[0]-Gyro(t)[0])/dt \quad (7)$$

$$AA[1]=(Gyro(t+dt)[1]-Gyro(t)[1])/dt \quad (8)$$

The adjusted accelerometer readings are translated from the object frame to the world frame using the current orientation of the object. Acceleration due to gravity (approximately 9.8 m/s/s on planet Earth's surface) is subtracted. The changes in each of the three dimensions of the object position can be found by multiplying by dt*dt.

With these or equivalent computations, the processing unit can generate estimates of position and orientation of the controller in six degrees of freedom. Due to the accumulation of errors in sensor readings, e.g., caused by noise, limited precision, or other factors, or possibly due to errors in transmission of the time series data, the actual position and orientation of the self-tracking object are likely to generate a set of estimates of position and orientation that differ at least somewhat from reality. Over time the difference may become sufficient to be relevant to operation of controlling a target object and the undergoing application (e.g., a video game). For example, the difference may become large enough that an animation generated by coupling the inferred position and orientation estimates may appear more and more unrealistic to the player as time progresses.

From time to time, the processing unit receives additional information regarding position and orientation of the controller that becomes available at an identifiable time, with the effect that the module in the processing unit is able to determine a new instantaneous position and orientation. For example, this can happen if a player stops moving the controller, with the effect that an identifiable period of quiescence is entered. According to one embodiment, the images from the camera can be analyzed to infer the new instantaneous position and orientation of the controller at a time.

When more precise information or other corrective information becomes available, the information can be used for more than just obtaining more reliable estimates at that moment in time. In particular, the information can be used to infer something about the errors over at least some portion of the recent history of sensor readings. By taking those error estimates into account, a new trajectory of the controller can be calculated. Additional details of determining the motion of the controller may be found in co-pending U.S. application Ser. No. 12/020,431.

At 208, a transformation(s) is determined as to how to transform the derived motion of the controller to motion of one or more target objects. According to one embodiment, the tracker is configured to maintain a mapping between the position and orientation of the controller and the output configuration of the target object. This mapping is initially specified per application depending on which target object is selected at a given time for that application. The details of this mapping are highly application dependent but generally include some set of the following transformations.

A) Scaling: The natural comfortable motions of the controller for an end user are likely confined to a fairly small area, such as a one-foot cube, while the desired range of possible positions for a target object may form a much larger area in the virtual environment. This scaling factor may be a linear factor of the motions from the user, for example, each 1 cm motion of the controller corresponds to a 1 m movement of a target object in the virtual environment. For other applications a non-linear mapping may be more appropriate, if the user moves his/her hand further from a natural rest position, the corresponding changes in position of the target object could be much larger. For example, moving the controller 10 cm from the rest position may correspond to moving a target object 1 m in the virtual environment, while a motion of 20 cm from the rest position may move the same target object 4 m. The rest position can be assumed by default to be the location at which the trigger to track was activated. Alternately additional calculations of the location of the controller relative to the body of the end user could be used to estimate the natural rest position for a human.

B) Orientation transformations: For some applications, it may be imagined that a direct mapping from a controller orientation to a target orientation would be desirable. There may be however situations in which a scaling up is desired in order to reduce the amount of wrist motion required of the user or to give finer control to the rotations of a virtual object or tool. Other applications may wish to disallow certain orientations of the target object, because they would correspond to undesirable configurations in the virtual world (e.g., because of mechanical constraints or intersections with other objects). As an example, a golf game may wish the club to correspond to a controller being used by a user, but disallow orientations that would place the club head into avatars representing players in the game. This could be handled by representing the orientation of the club as the allowable orientation closest to the actual orientation of the controller.

Once the transformation(s) is determined at 208, it is applied to mapping from the motion of the controller to the motion of the selected object at 210. In other words, the controller configuration is mapped to the target object at 210 and the resulting target object configuration is sent to the application at 212. The display is then updated to show the motion of the target object in a virtual environment at 214.

In many applications, it is desirable to give the user some direct control over the mapping being used. In one embodiment, the user is allowed to control the strength of the linear scaling so as to have fine control of the target object during a motion. For example, a user can specify the scale using a second controller when available. Separate gestures for zooming in and out can be defined for the second controller. These gestures are recognized using technology such as that found in U.S. Pat. No. 7,702,608, which is hereby incorporated by reference. Alternately the user can select with a button or other means to adjust the scaling and move either on the primary controller or a secondary controller closer or further from the screen to adjust the amount of zoom. A simple mapping would involve moving towards the screen to zoom in and cause motions to move a smaller distance in the world space and away to zoom out and cause motions to move larger distances in the world space.

According to one embodiment, the user can control the movement of the target object relative to its environment by imparting a continuing impulse or inertia to the target object. This allows the location of the target object within the virtual environment to keep changing while the trigger is not active and the user has stopped moving the controller. There are two main approaches of doing this and which one would be more appropriate is application-specific.

In the first approach, after the user enters a command (e.g., pressing down a button), a portion of the virtual environment being displayed at the moment is grabbed. The motion of the controller is then mapped into an impulse that is imparted onto that portion of the environment when the motion trigger is released. This impulse then causes the portion of the environment to drift, relative to the target object, for some time. This is visually similar to an interaction used with some touch screen devices in which a user makes a rapid motion and then releases his/her finger or stylus in order to cause the screen display to move rapidly before drifting to a stop.

In the second approach, no additional command is required to "grab" the environment. Instead, if the motion trigger is released while the target object still has a significant velocity, the target object is "thrown" and continues in the same direction afterwards for some time.

It shall be noted that, after releasing the trigger, both approaches can be regarded as equivalent by inverting the direction of the impulse implied in the first approach and applying it to the target object instead of the environment. This inertia would naturally decay over time at some rate similar to the action of friction in the real world. In both approaches, if the user desires a more sudden stop, the system will respond to a new trigger of the controller by stopping the drift of the target object or the environment and letting the user resume control from the current position.

As an example, one objective of a game is to build different forms of military units and direct them to defend or attack opponents at different locations on a map. In a setting like this, one embodiment described in the present invention is used to rapidly select individual equipment, e.g., simply using a controller to point at a plane and then taking control of positioning the plane. Small adjustments to the position of the plane can be accomplished by mapping directly the movements of the plane to the movements of the controller, while large adjustments to the position can be accomplished rapidly by using the second approach described above to "throw" the plane towards a desired location, leaving the user free to select another. In a real-time game like this there are occasions where the user would like to change their viewpoint from one portion to another portion of the map rapidly. To accomplish this, the user could "grab" the map being displayed on the screen and spin it to one side or another in order to rapidly move their viewpoint to a new location. Thus, if the user wishes to look at a location far to the east of the current view, the user could "grab" the current view, make a rapid motion to the left (west) to start the map spinning and then grab the map again when the location being interested in is at the center of the view in order to stop the map from sliding further.

Figure 2C:
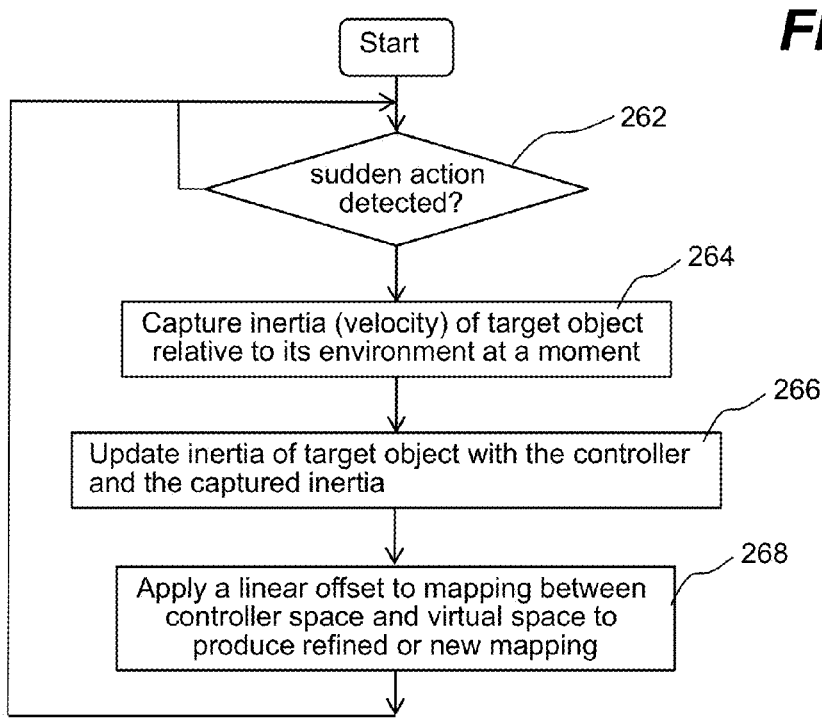

The above approach of inertia control of the target object is shown in a flowchart or process 260 shown in FIG. 2C. The process 260 may be implemented independently or as part of the process of FIG. 2A to implement a natural stop of a target object after a movement in responding to a stop movement from the controller or control the movement of a target object relative to its environment by imparting a continuing impulse or inertia to the target object or the environment. When the process 260 is activated or used, a sudden action is detected at 262. A sudden action is defined as occurring when a user issues an end tracking command (e.g., releasing a motion trigger) while the controller still has significant velocity. When such a sudden action is detected, the velocity of the target object at that moment is captured at 264.

Accordingly, the inertia (current velocity of the target object relative to its environment) is recorded at 264. In other words, the visual velocity of a selected object just before the user releases the motion trigger is captured. The visual velocity is the initial velocity to run down gradually to effectuate the sudden movementso as to show visually a smooth and natural transition. Thus the target object (e.g., an avatar) is set with the controller and the recorded inertia at 264 according to the velocity of the controller at the moment the use first activates a trigger to make a sudden movement (e.g., change a scene). In one embodiment, velocities below some minimum threshold will not impart the inertia to the target object in order to avoid unintended invocation of this approach. When the controller trigger is no longer active, the inertia will decrease over time from its captured value at 262 according to a predefined decay function. An example decay function is a proportionate decay in which the previous velocity/inertia is scaled downwards at each time step by a constant factor, alpha, where alpha is defined between 0 and 1.

A linear offset is applied at 268 (also applicable to 208 of FIG. 2A) to the mapping between the controller space and the virtual space to produce a refined or new mapping. As an example, a mapping has a correspondence between a rest position of the controller and a location 0, 0, 0 in the virtual world. If the inertia is 1 meter per second in the x direction and the time elapsed since the last update is 0.1 seconds, the new mapping would be offset by inertia*(deltaT)=0.1 meters and would have a correspondence between the rest position of the controller and location 0.1, 0, 0 in the virtual world.

It shall be noted that although the approach described above describes how the motion of the user affects a target object in three-dimensional space, some applications may wish to restrict the user to a two-dimensional space. This can be done by use of the linear scaling input and simply setting all positions along one of the axes to be mapped to the same value in the world space. Adjustments along this fixed dimension could be controlled as described for changing the scaling sensitivity or by having a threshold for the amount of displacement in the direction perpendicular to the restricted plane and having large displacements revert to a 3D mapping with scaling along all three axes.

In one embodiment, instead of a one-to-one mapping between the controller position and the target object, the approach maps the movements of the controller into movements of the target object in a non-linear fashion. This can allow small motions to generate more precision for small adjustments, while large motions generate rapid changes in position. To see how this differs from the non-linear scaling described above, two ways of moving the controller 20 cm to the right may be considered. In one case, the user rapidly moves in one motion, while in the other case, the user makes 4 small slow motions in the same direction. Under the non-linear mapping, the last of the 4 small motions will travel further than the first but both approaches of moving 20 cm will result in the same target object position. In the alternate movement mapping method described here, all 4 of the small motions will each result in roughly the same change in the target object's position, but the target object will have moved a much smaller distance in total than it did when one large motion was made.

Figure 3A:
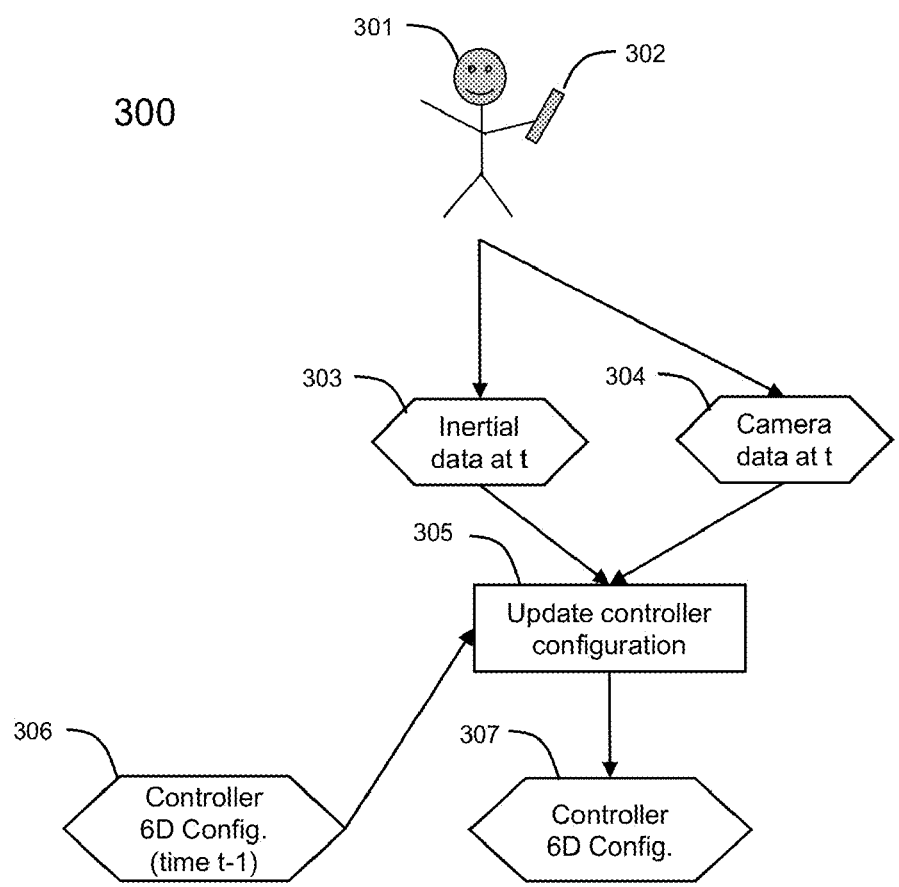
FIG. 3A shows a process for tracking motion in six degrees of freedom.

FIG. 3A shows a functional block diagram 300 of a tracking unit or a tracker, and how the tracker tracks the position and orientation of the motion controller 302 held by the end user 301, according to one embodiment of the present invention. The motions of the controller 302 are reported by inertial data 303 from the inertial sensors therein and images 304 from one or more cameras 305 disposed in front of or in the vicinity of the user. As described above, the image data is provided to facilitate the determination of the motion of the controller 302, if needed. What FIG. 3 shows is that the motion is often determined from a previous time. For example, the motion of the controller at a moment T is determined from the motion of the controller at a moment T−1. To facilitate to minimize errors in determining position and orientation of the controller 302, the images 304 are analyzed. According to one embodiment, the controller 302 is labeled with one or more tags that can be readily detected in the images 304 to track the movements of the controller 302. In another embodiment, the images 304 are from a pair of stereo cameras. In any case, the output of the tracker is the position and orientation of the controller 302 in six degrees of freedom.

Figure 3B:
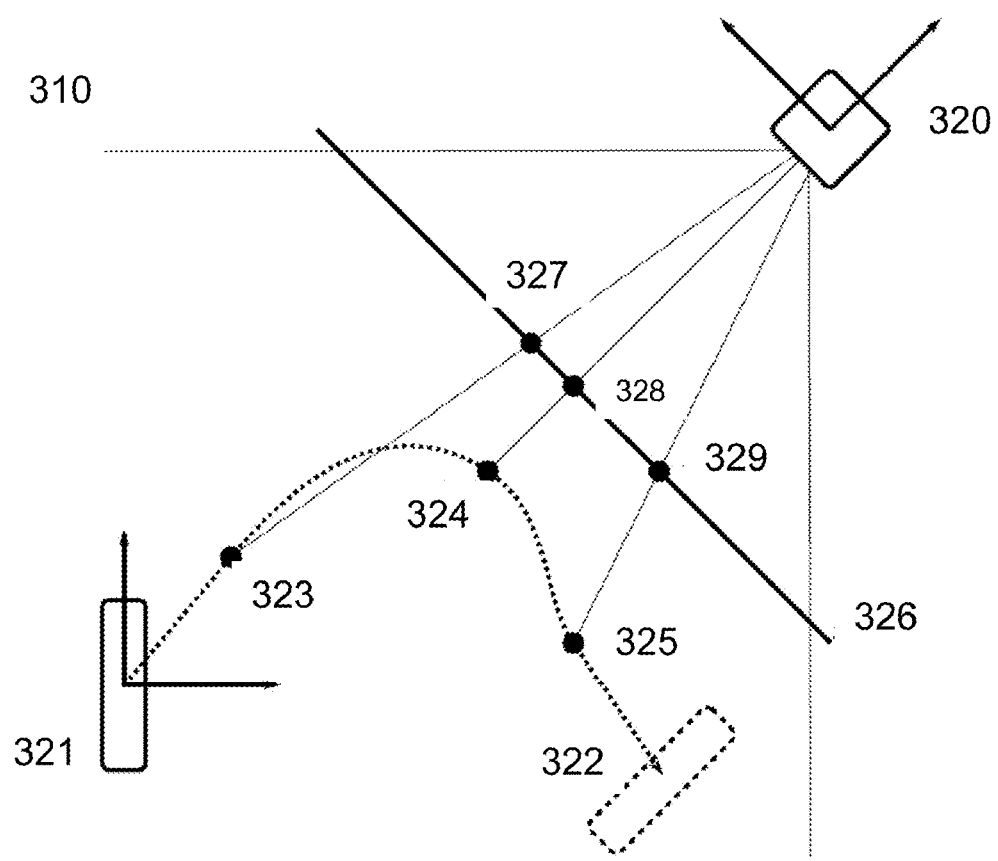
FIG. 3B shows a top-down view of a motion controller and a sample motion path it may take during interaction with an application (e.g., a video game)

FIG. 3B is a top-down view 310 of a motion controller 320 and a sample path 322 it may take during interaction with an application. There are 3 example points 323, 324 and 325 on the path 322. Also shown are a camera 320 with a corresponding image plane 326 with 3 points 327, 328 and 329 corresponding to the 3 points 323, 324 and 325 from the motion path 322. The coordinates of the points 323, 324 and 325 in the frame of reference of the motion controller (501) can be readily derived with a confined setting.

Figure 3C:
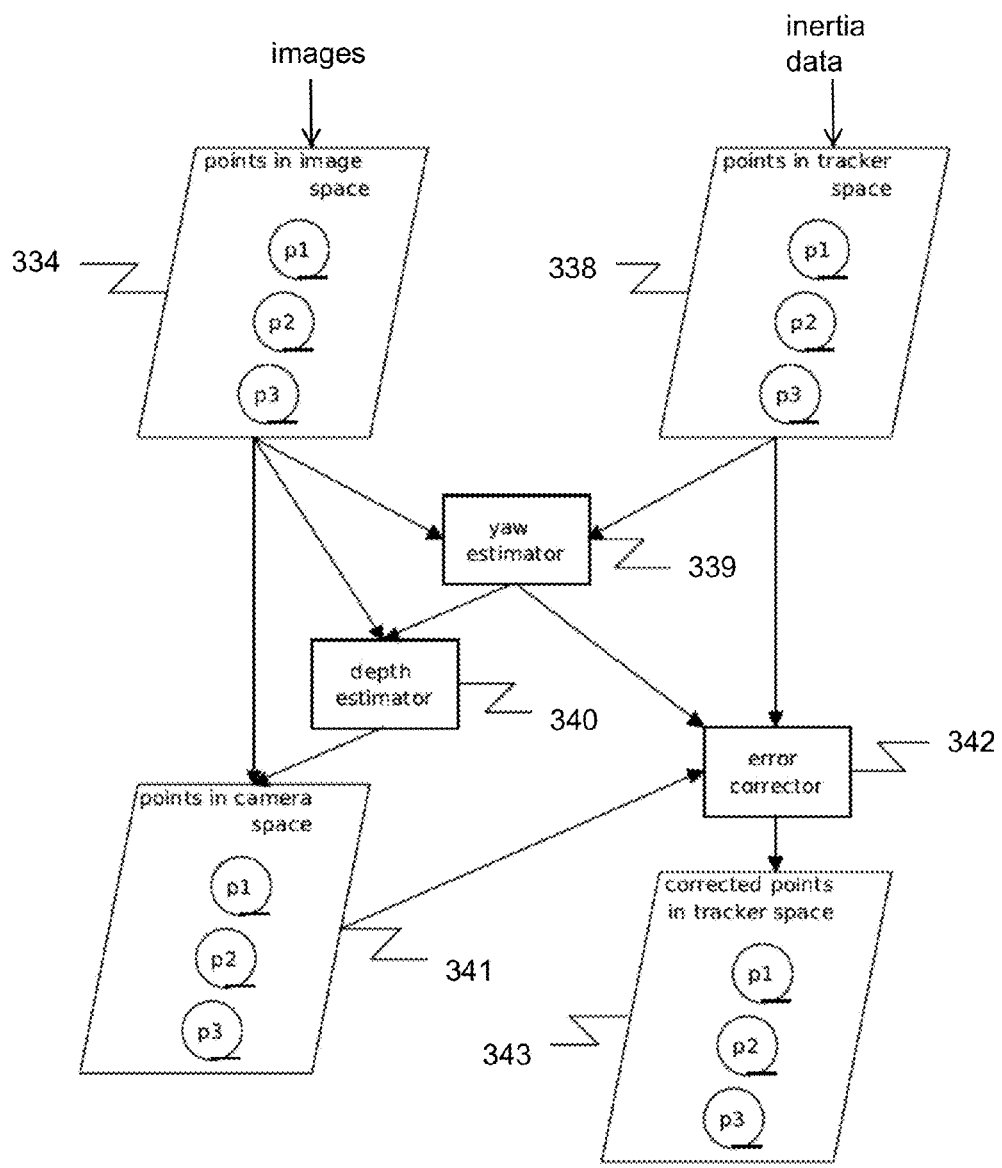
FIG. 3C shows an exemplary approach of determining three exemplary points on the motion path of FIG. 3B from an image space to a physical world (i.e., a tracker space)

FIG. 3C shows an exemplary approach of determining corresponding three points from an image space to a physical world (i.e., a tracker space). As described above, a controller containing inertial sensors generates inertial sensor data over time while a camera provides a sequence of images over time. The sensor data can be processed by a tracker as described previously, resulting in a set of consecutive points or positions 338 in a 3D space defined by the tracker. The image data can be processed to derive a set of consecutive points 334 in the 2D image plane of the camera with some known correspondence to the tracker points 338. Given the respective estimations of the three points in each space, the difference 339 in yaw between the tracker space and the image plane can be determined. The details of determining such a difference is omitted herein to avoid obscuring aspects of the present invention, as those skilled in the art can readily find appropriate mathematical equations in view of the description herein.

Once this yaw is determined it is possible to estimate the depth 340 of each of the 2D points from the images, resulting in a set of consecutive points 341 in a 3D space determined by the camera. As a result, the points in the tracker space 338, the points 341 in the camera space and the angle between them 339 can be synthesized 342 to produce a new set of consecutive points 343 that incorporates much less error than the original sets of points 338 and 341.

Figure 4:
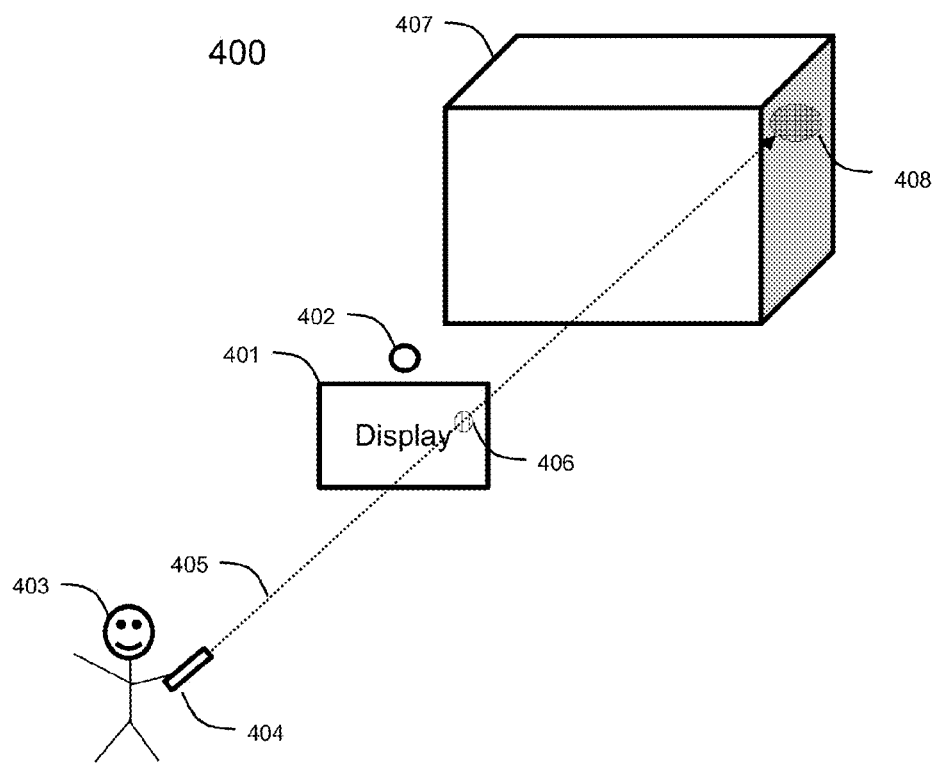
FIG. 4 shows an exemplary pointing interaction to map a selection in a two-dimensional display to a three-dimensional virtual environment.

FIG. 4 shows another use of the tracking capabilities in one embodiment in order to provide a direct pointing capability for an end user. As described above, one of the important features, objectives and advantages in the present invention is to allow a user to point with a controller at an object displayed on a screen in a natural way. It is desirable that an object selected corresponds highly with the object that would be seen by sighting (looking down) the controller itself towards its tip. In FIG. 4, it is shown that the end user 403 has aimed the motion controller 404 along a given trajectory 405 intersecting the plane continuing the screen 401 at point 406. For many applications selecting the object that has been drawn at that location on the screen will be sufficient. However, if the display image represents a three dimensional scene, it will often be more desirable to consider the ray to pass through the screen into the virtual environment 407 and instead report the intersection point as the first point in which the ray from the user's controller intersects an object in that scene 408.

Figure 5:
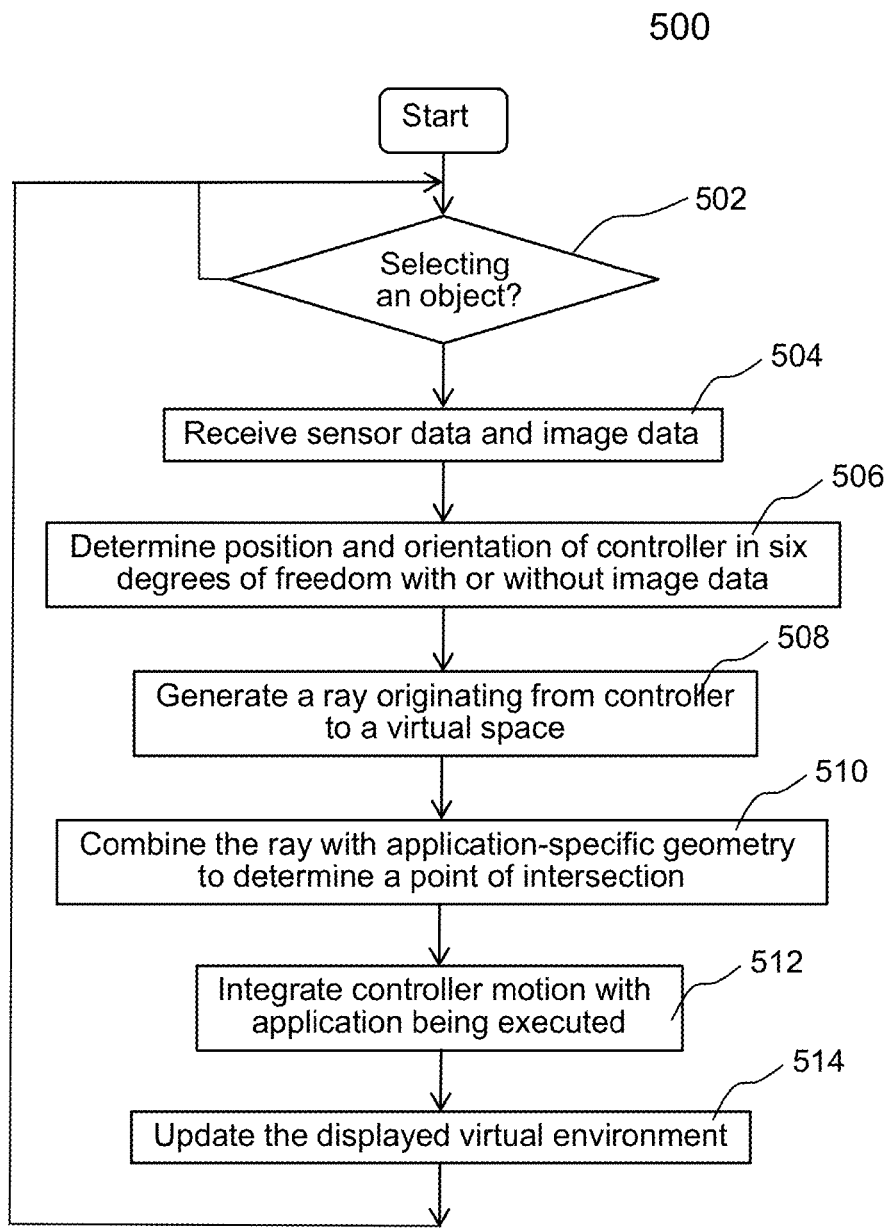
FIG. 5 shows a flowchart or process for enabling user pointer control by ray tracing.

FIG. 5 shows a flowchart or a process 500 for selecting an object in a three-dimensional environment based on an interaction point pointed at by a motion controller. The process 500 may be understood in conjunction with FIG. 2A and FIG. 4. According to one embodiment, the process 5 starts when a user decides to use a controller at 502 to point at an object in a 3D virtual environment (e.g., a video game) being displayed.

As described above in conjunction with FIG. 2A, the position and orientation of the motion controller can be determined in six degrees of freedom at 504 and 506. The derived position and orientation of the controller is used at 508 to generate a ray from the controller to an object in a virtual environment. This ray is generated by first translating the position of the controller into an assumed position in the virtual environment. This mapping can be created in the same manner as that described above for FIG. 2A. A ray is then created originating at that point and projecting in the direction corresponding to the orientation. The ray is then combined with application-specific geometry to determine a point of intersection using a method for ray-tracing at 510.

There are many ways to perform the ray tracing. Details of various ray tracing techniques are described in "Computer Graphics: Principles and Practice" by Foley, vanDam, Feiner, and Hughes, 1990, which is hereby incorporated by reference. For a 2D application, this geometry corresponds to a plane. The appropriate distance from the user to the display gives a natural mapping between what the user is pointing at and the position on the screen. One possibility for determining this plane is to have an initial calibration step during which the user uses the motion controller to point at each of the four corners of their screen. This calibration can then be used to find the actual size and location of the screen with respect to the camera being used to find the absolute position of the controller.

According to one embodiment, no assumptions are made about the screen other than that it is flat, a minimum of eight measurements may be taken to calibrate the position, orientation and size of the screen. The location of the four corners of the screen can be represented mathematically as $(c\_x+/-\text{width}/2, c\_y+/-\text{height}/2, c\_z)*R$, where $c\_x, c\_y, c\_z$ is the position of the center of the screen in the camera's coordinate system, width and height are the size of the screen and R is a 3×3 rotation matrix produced from the rotations around the x, y, and z axes in the camera's coordinate system. When the user points the controller at a given corner, the angle between the known location of the controller and the screen corner point can be calculated as an equation of these eight variables. Taking a difference between this angle and the orientation of the controller, an error measure can be obtained for that reading. Doing this for two different controller locations (such as minimum and maximum playing range for the user) and making sure the two points are not co-linear with any of the corners of the screen, a series of eight independent equations can be obtained. Numerous methods and tools are available for optimizing such simultaneous equations, including the well-known program Matlab. More accurate estimates can be obtained by taking additional measurements or making additional assumptions about the orientation of the screen, such as assuming that its bottom edge is aligned with the ground plane and that the screen is aligned vertically with gravity.

This calibration process can then form a basis for the plane in the virtual world corresponding to the display screen. In a 3D application, the geometry used can instead be a 3D model of the objects being displayed, where the location of these objects may be arranged relative to the position of the display device. When intersecting with 3D objects, the object selected may not necessarily match the object that is displayed on the screen at the point the ray intersects the screen. The 3D objects in the scene are collapsed according to the viewing angle of the camera and if the angle of the motion controller is different, the ray will diverge from its entry point as it proceeds deeper into the scene. This will also allow the application to render the ray itself if so desired and could allow the user to select objects that are obscured from view by angling the controller around his or her viewpoint. In an environment in which the display itself is in 3D, this is expected to result in much more natural pointing and selection.

In another embodiment, the display shows three dimensional images to a user (e.g. 3D TVs or 3D motion projectors). In this embodiment, the application-specific geometry 407 can extend both forward and back from the display in order to allow the user to point at objects that appear to be at locations within his/her local (physical) space. It should be noted that in this case the intersection 408 of the ray with the virtual environment may be closer to the user than the display, and the ray from the user may not intersect the display at all.

The embodiments described above assume that the actual physical position of the motion controller has been determined. Similar levels of control can be achieved by having the ray originating from a position that is selected by an application. Short duration motion around that point is then possible using the relative position and orientation of the controller that can be determined without images from the camera or the position changes can be ignored and all selection can be done by the changes in orientation of the controller. The assumed position of the motion controller could also be specified by the user through another method of control such as an analog joystick.

The technique of selecting 3D positions described above requires the existence of a predefined object in the application, whether a 2D plane or a set of virtual objects. In order to allow the user to select an arbitrary 3D point in a 3D space, an additional input is required from the user to specify how far that point should be along the ray. A preferred method of providing this input involves using a second controller. This second controller can be used in a number of ways to provide the depth information for specifying an arbitrary 3D point briefly enumerated below.

A) Use the distance of the second controller from a reference point to determine the depth of the point along the ray specified by the first controller. Possible reference points would include the location of the screen, the location of the camera, or the location of the first controller.

B) Use gestures from the second controller to zoom in or out an application-specific distance.

C) Calculate another ray from the second controller using the same methods as described for the first controller and use this to determine the geometry to intersect the first ray with. One possibility would be to define a plane aligned with this second ray and having the same vertical (y-axis) alignment as the screen. This plane could then be used in place of the virtual representation of the screen to determine an intersection point. Pointing the second ray closer to the position of the first controller will move the intersection point closer to the user in the virtual world while moving the ray closer to parallel will move the intersection point further away in the virtual world. A second possibility would be to choose the intersection point as the closest point between the two rays.

The points can be parameterized along the ray by a length variable, giving a series of points $(a\_i*I\_i, b\_i*I\_i, c\_i*I\_i)$ for ray i, where $a\_i$, $b\_i$, and $c\_i$ represent the slopes with respect to the x, y, and z axes respectively. The closest point between the two rays can then be represented by minimizing the equation $(a\_1*I\_1-a\_2*I\_2)^2+(b\_1*I\_1-b\_2*I\_2)^2+(c\_1*I\_1-c\_2*I\_2)^2$ with respect to the two variables $I\_1$ and $I\_2$. A number of methods and tools exist for solving such equations, such as the software program Matlab.

The above embodiments assume the existence of a camera and use that camera to obtain an absolute position of the controller relative to that camera. The following alternate embodiments remove the requirement of absolute position and give similar control abilities for the user.

First, the inertia commands can be used as one way to change the position of a target object, requiring only a short measurement of relative change in position or accelerations of the controller to determine the desired inertia as desired above. For additional precision, short-term relative tracking in accordance with the mapping described above can be used with the center of the mapping volume always being assumed to be the location of the motion controller when tracking is triggered and the additional requirement that tracking only be triggered while the controller is at rest.

As an alternative to using inertia commands for large motions in the virtual space, the relative motions of the user can be mapped to changes in position of the target object, but in a non-linear way such that longer and faster motions will result in disproportionately larger displacements of the target object. Fine control can then be achieved by making brief short motions once the gross location of the target object has been set. A similar approach is used in computer mice in order to allow a combination of quick relocations on the screen and fine control within a limited area. Note that this non-linear mapping can be applied to either the relative displacements in position of the motion controller or the time series of impulses (accelerations) of the motion controller itself.

As a general note, the above embodiments always refer to a 6D configuration, but for many applications, the roll of the target object may be irrelevant (e.g. on a flashlight or laser pointer). Thus for those applications a 5D configuration would function identically as described above if for some reason the final measurement of the roll of the object was unavailable.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A system for a user to select a portion of a 3D virtual environment being displayed, the system comprising:
   a controller including a plurality of inertia sensors providing sensor signals sufficient to derive changes in motion of the controller in six degrees of freedom;
   a processing unit, receiving the sensor signals, configured to derive position and orientation of the controller from the sensor signals, and generate a ray originating from the controller to an interaction of a screen provided to display the 3D virtual environment, wherein the ray is further projected into the 3D virtual environment by a ray tracing technique; and
   a video capturing system including at least one camera, disposed in front or in vicinity of the user to capture the motion of the controller being held by the user, wherein the processing unit receives images from the video capturing system, the controller is used to calibrate a relationship with the screen used to display the 3D virtual environment to estimate size and location of the screen with respect to the camera so as to find absolute position and orientation of the controller in a physical world.

2. The system as recited in claim 1, wherein the portion of the 3D virtual environment is an object, and the ray is combined with an application-specific geometry to determine an intersection of the ray with the screen.

3. The system as recited in claim 2, wherein the processing unit is further configured to integrate the motion of the controller with an application being executed, the 3D virtual environment is a display resulted from the application.

4. The system as recited in claim 1, wherein the changes in the motion of the controller are determined in the processing unit, with or without image signals from the camera.

5. The system as recited in claim 4, wherein the controller is subsequently used to control motion of a selected object in the 3D virtual environment.

6. The system as recited in claim 4, wherein the controller is caused to point at four or more corners of the screen to allow determination of an angle between a known location of the controller and each of the corners.

7. The system as recited in claim 4, wherein the processing unit receives images from the video capturing system, the images are processed to determine an equivalent trajectory of the controller in a 2D image plane, the trajectory is used together with the sensor signals to determine the absolute position and orientation of the controller in a physical world.

8. The system as recited in claim 7, wherein the ray is originated from the absolute position and orientation of the controller.

9. The system as recited in claim 1, wherein an additional input is provided by the user to select the portion of the virtual environment along the ray.

10. The system as recited in claim 9, wherein the additional input is from another controller.

11. The system as recited in claim 1, further comprising two or more controllers to select the portion of the 3D virtual environment, wherein respective rays are projected from the two or more controllers and distances between the rays are calculated.

12. The system as recited in claim 1, wherein the portion of the 3D virtual environment is an object capable of moving relatively in the 3D virtual environment or one of scenes in the 3D virtual environment.

13. The system as recited in claim 1, wherein the screen is capable of displaying the 3D virtual environment in 3D, one or more rays extend before or into the screen in order to allow the user to point at the portion that appears to be at a location in a physical world.

14. A method for a user to select a portion of a 3D virtual environment being displayed, the method comprising:
   receiving sensor signals from a controller sufficient to derive motion of the controller in six degrees of freedom, wherein the controller includes a plurality of inertia sensors that generate the sensor signals when being manipulated by the user;
   deriving in a processing unit the motion of the controller from the sensor signals; and
   determining an orientation of the controller by ray originating from the controller to a display screen provided to display the 3D virtual environment, wherein the ray is further projected into the 3D virtual environment by a ray tracing technique;
   generating images from a video capturing system disposed in front or in vicinity of the user to capture movements of the controller by the user, wherein said determining an orientation of the controller comprises calibrating a relationship of the controller with the display screen to find an actual size and location of the display screen with respect to the video capturing system so as to find absolute position and orientation of the controller.

15. The method as recited in claim 14, wherein the portion of the 3D virtual environment is an object, and the ray is combined with application-specific geometry to determine an intersection of the ray with the display screen.

16. The method as recited in claim 15, further comprising integrating the motion of the controller with an application being executed in the processing unit, the 3D virtual environment is a display resulted from the application.

17. The method as recited in claim 14, wherein the controller is caused to point at four or more corners of the display screen to allow determination of an angle between a known location of the controller and each of the corners.

18. The method as recited in claim 14, wherein the images are processed in the processing unit to determine an equivalent trajectory of the controller in a 2D image plane, the trajectory is used together with the sensor signals to determine absolute position and orientation of the controller in a physical world.

19. The method as recited in claim 18, wherein the ray is originated from the absolute position and orientation of the controller.

20. The method as recited in claim 18, further comprising receiving an additional input from another device to select the portion of the virtual environment along the ray.

21. The method as recited in claim 20, wherein the another device is another controller, and a distance between the controller and the another controller is determined to infer a depth of the portion along the ray being selected by the controller.

22. The method as recited in claim 14, further comprising projecting rays from two or more controllers to select the portion of the 3D virtual environment, and distances between the rays are calculated.

23. The method as recited in claim 15, wherein the portion of the 3D virtual environment is an object capable of moving relatively to the 3D virtual environment or one of scenes in the 3D virtual environment.

* * * * *